Nov. 2, 1937.  J. E. BOOGE ET AL  2,098,025
PROCESS OF RECOVERING SOLUBLE TITANIUM COMPOUNDS FROM TITANIFEROUS ORES
Filed Nov. 23, 1935

INVENTOR.
JAMES E. BOOGE,
ROBERT M. McKINNEY,
IGNACE J. KRCHMA.
BY
ATTORNEY.

Patented Nov. 2, 1937

2,098,025

UNITED STATES PATENT OFFICE 2,098,025

PROCESS OF RECOVERING SOLUBLE TITANIUM COMPOUNDS FROM TITANIFEROUS ORES

James E. Booge, Wilmington, Ignace J. Krchma, Elmhurst, and Robert M. McKinney, Roselle, Del., assignors, by mesne assignments, to E. I. du Pont de Nemours and Company, a corporation of Delaware Application November 23, 1935, Serial No. 51,254

6 Claims. (Cl. 75—115)

Our invention relates to novel methods of continuous attack of titaniferous ores by means of acids in which the reactants continuously travel from the charging end of the apparatus to the discharging end where the final products of the reaction are continuously discharged and where the reactants continuously move in respect to the confining walls of the apparatus. In a preferred embodiment of our invention, we define various reaction zones corresponding to various stages of the reaction. In a more specific embodiment of the process of our invention, we continuously feed the reactants, either singly or already mixed into an initiating zone, in which we cause the reaction between the titaniferous ore and the acid to start. We then continuously remove the initiated reaction mass from said first zone, and continuously pass the reacting mass through a soaking zone from which it is continuously discharged in solid form, the reaction mass being in the various zones broken up by mechanical means.

Our novel process is applicable to attacking the various titaniferous ores decomposable with acid, and particularly to their treatment with sulfuric acid. Ilmenite, commonly considered to be an iron titanate, is the best available raw material from which soluble titanium compounds can be recovered, and our novel process is particularly adapted to the treatment of ilmenite, though natural rutile and other titanium oxide ores can be treated in a similar manner.

The attached figures show various forms of apparatus for carrying out our novel process.

Figure 1:
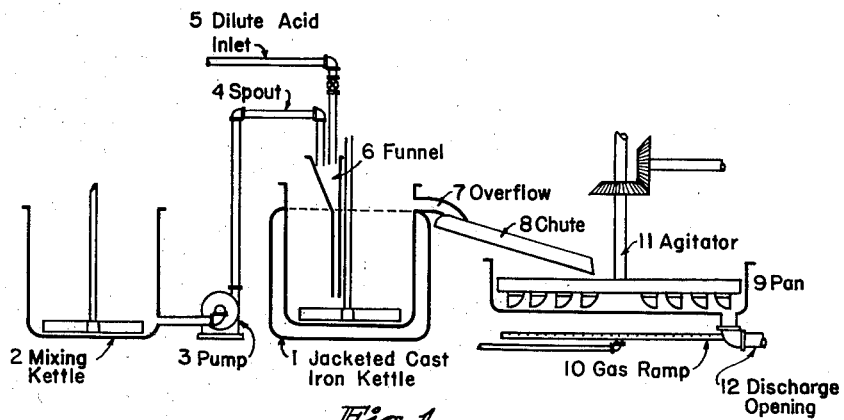
Fig. 1 shows the apparatus for a "two-pan" attack.

Various difficulties have arisen in attacking titaniferous ores with sulfuric acid, which are due to certain characteristics of the reaction.

Ilmenite, for instance, can be mixed with sulfuric acid of different concentrations without, at ordinary temperatures, any noticeable reaction taking place. On heating the whole mass the reaction, however, becomes so violent, and due to its exothermic nature, it can hardly be controlled.

On the other hand, relatively concentrated sulfuric acid is required to attack the ore, and the reaction products of such an acid with the ore are solid and very little soluble in acids of the concentration required.

When one attempts to feed solid, ground ore into heated acid, one meets either with the difficulty that the reaction mass solidifies before the reaction is completed, or if one uses a large excess of acid, it is impractical to separate the excess acid from the reaction product, and this excess is lost and renders the operation uneconomical.

In view of these difficulties, the practice has been to operate in either relatively small batches, or in exceedingly large batches.

In the first case, small pans are filled with a mixture of ilmenite and sulfuric acid and kept in a heated room, and when the reaction starts the pans are taken out and the reaction allowed to continue and go to whatever completion it can.

More common has been the procedure of mixing the ore and the sulfuric acid in open or covered large vats equipped with powerful agitating means and external heating. The reaction is then initiated by creating a locally superheated zone from which the reaction propagates itself throughout the mass. As the reaction progresses, the mass stiffens and becomes pasty. Agitation is continued until a powdery mass results. The power consumption becomes high as the plastic state disappears and the powdery mass is then dumped into large pits or bins where it is allowed to rest until the reaction is more or less completed. It is common to accumulate several batches in this procedure. This operation is sometimes called "curing" and in some mechanical respects resembles the manufacture of phosphate fertilizers from phosphate rock and sulfuric acid. The quiescent condition at which, in these processes, the reaction is terminated, determines that the reaction is never quite complete, as parts of the charge contain more acid than others, which results in incompletely reacted ore; it also happens in these operations that parts of the charge may be superheated, whereby already formed titanylsulfate decomposes and the resulting decomposition products are no longer soluble in water or dilute acids, and are thereby unrecovered in the subsequent aqueous leaching of the attack mass.

Other disadvantages of operating in manners, as described above, are for instance:

The mechanical difficulties in handling and transferring from one vessel into another, the pasty and solid reaction products;

The haphazard nature of the control of the reaction;

The large variations in the composition and physical properties of the reaction product;

The intermittent supply of a product suitable for further processing;

The high cost of maintenance and operation;
The possible need of retreatment of the product if the attack did not go to completion.

These difficulties and drawbacks are overcome in our novel process.

We provide for a zone of reaction into which we continuously feed the ore and acid, either individually or already pre-mixed, the two reactants being added in predetermined reacting proportions.

The reaction is initiated in this zone by simultaneous addition to the reactants of a small amount of water, steam, or dilute acid, or by heat. Once a hot body of reacted mass is formed in this first zone, the reaction will proceed indefinitely with the addition of fresh ore and acids, particularly when the acid feed consists of oleum and dilute acid, for instance, of the type obtained as a by-product in the working up of the reaction mass.

The reaction mass is maintained for a short time only in this zone, and as soon as the reaction has started, it is discharged into a second zone in which the reaction is completed. The reaction mass enters this second zone in the form of a semi-fluid paste, here again the reaction mass is kept in movement in respect to the confining walls of the zone, and in addition progresses towards the discharge end of the zone. The exothermic temperature in this second zone is so regulated, with additional extraneous heating if required, that the semi-liquid mass gradually solidifies; water is evaporated in this step.

It is essential that during the solidification of the reaction mass and its movement towards the discharge end of the apparatus, the mass be kept under conditions of attrition so that the mass does not bake or cake together.

The reaction mass is maintained at elevated temperature while moving in this zone until completely reacted, and, as discharged, is directly adapted for the subsequent leaching operations in which aqueous solutions of titanium salts are obtained. As this leaching of the reacted or sulfated mass forms no part of our invention, and is well known in the arts, it does not need to be described in more detail.

Various types of apparatus are adapted to operate our novel process.

The individual steps can be performed in separate vessels connected to discharge from one into the other, or we can use one single vessel provided it is equipped with the necessary agitating and heat-controlling means as required in the various steps.

A few types of equipment which were found satisfactory for operating our novel process are described in the following:

*Double-pan attack*

An apparatus adapted for this is shown in schematic form in appended Fig. 1. No. 1 in this figure is a jacketed cast-iron kettle equipped with an agitator and with necessary attachment for passing a heating or cooling fluid through the jacket. No. 2 is a mixing kettle in which the ground ore and acid are intimately mixed, and the mixture is, through pump 3 and spout 4, continuously delivered in measured quantities into funnel 6. 5 is a pipe line through which water or dilute acid can be introduced into the reaction pan. 7 is an overflow which delivers the partly reacted, still pasty mass through chute 8 into the flat pan 9. This pan is equipped with a heating device, as for instance, a gas ramp 10, or it can be heated in any other appropriate manner. This pan carries also a plow-share type agitator 11, and has a discharge opening 12.

To start the operation, we heat pan 1 and run in the mixture of ore and acid simultaneously. The reaction is initiated either when the ore-acid mixture strikes the hot pan or we add a certain amount of water or weak acid through pipe 5, or again we might introduce some live steam into the mixture when it strikes the pan. As soon as the reaction is initiated, we continue the addition of the ore and acid mixture, and the reaction mass overflows in a pasty state, and is delivered toward the center of pan 9 where it gradually solidifies, and is slowly moved in a spiral path towards the discharge end, being in the meantime broken up so that it is discharged as a granular or sand-like mass. In this pan, the conditions are so regulated that the mass is kept at a temperature not below 180° C. This discharged product is substantially completely sulfated and is ready for leaching with water or dilute acid, whereby solutions of titanium sulfate are obtained.

Operations in a two-pan system are exemplified as follows:

(1) Ilmenite analyzing 61% $TiO_2$ and 25% Fe and sulfuric acid of 93% strength at 75° C. were continuously added to a mixing tank, and at the beginning the reaction was initiated by the addition of a little water. On continued addition, the heat of the reaction mass was sufficient to initiate the reaction of the incoming mixture.

The initiated reaction mass was allowed to overflow into the second, agitated tank where the temperature rose to 180° C. The reaction continued in the second pan and the sulfated ilmenite was discharged as a powdery dry mass.

(2) Oleum was mixed with 55° Bé. sulfuric acid so that a 91% acid of a temperature of 70° C. resulted. This was mixed with an ilmenite analyzing 54% $TiO_2$ and 29% Fe in the ratio of 1.5 parts by weight of 91% acid per part of ilmenite.

This suspension of ilmenite in the warm 91% acid was run into the first reaction pan where heat initiated the reaction. The mass was then allowed to overflow into the second pan where it heated up and from which it was obtained as a dry powder.

Figure 2:
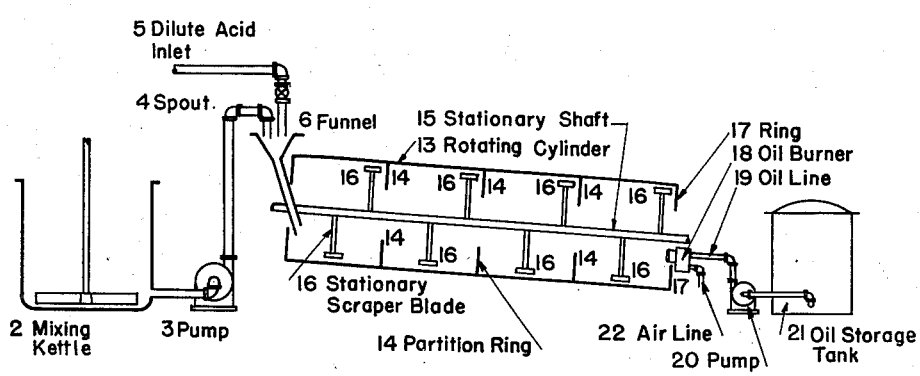
Fig. 2 shows the apparatus for a "rotating kiln" attack.

Another convenient type of apparatus for performing our novel reaction is shown in schematic form in Fig. 2, representing a rotating kiln attack:

As in Fig. 1, Nos. 2, 3, 4, 5, and 6 represent the acid-ore mixing tank, pump, ore-acid mixture delivery spout, water or weak acid feed and funnel.

No. 13 of Fig. 2 represents a rotating slightly inclined cylinder of acid and heat resisting material.

This cylinder carries a number of partition rings 14, which divide the kiln into several sections. The apparatus has also a stationary shaft 15, passing through the center of the cylinder to which stationary scraper blades 16 are attached. A ring 17 at the discharge end of the kiln prevents too quick delivery of the material. The kiln is preferably heated by an oil burner 18 to which fuel oil is delivered from storage tank 21, through pump 20 and pipe 19. 22 is an air line to the burner. The kiln could be heated in any other convenient manner.

The ore-acid mixture is delivered into the upper part of the kiln, into the first section formed by the first partition ring, where, due to the heat or addition of water, steam or dilute acid, the reaction is initiated. The pasty mass formed in this first section is moved forward, and, due to the scraper and partition rings, the mass is well agitated, and when it starts to solidify is broken up so that it is finally discharged as a sandy or granular, substantially completely sulfated mass.

Conveyor attack

In this type of operation we again preferably initiate the reaction in a vessel into which we continuously deliver acid and ore, and in which we initiate the reaction either by heat, or addition of steam, water, or dilute acid. The pasty mass of initiated reaction mass is then continuously removed from the first vessel and delivered into a conveyor equipped with a helicoidal screw which moves the mass forward while it is kept at sufficiently high temperature so that the sulfation is substantially completed when the mass, which during passage through the conveyor, was transformed into a granular or sandy mass, is finally delivered at the discharge end of the conveyor.

A special type of operation in a conveyor is described in an application by Mr. F. H. McBerty, Ser. No. 51,248, filed on even date herewith.

The conveyor attack method can be operated, for instance, as follows:

Ilmenite containing 54% TiO₂ and 29% Fe is suspended with agitation in 20% fuming sulfuric acid, and this suspension, along with 25% sulfuric acid containing ferrous sulfate recovered from the hydrolysis of titanium sulfate, are run into the front end of a conveyor trough. For each pound of ore we can, for instance, use 1.24 pounds of oleum and 0.41 pound of the recovered dilute acid. On mixing the two, the heat generated initiates the reaction. As the mixture progresses through the conveyor, away from the original initiating zone, the reaction proceeds, it gradually becomes pasty, and emerges finally as a dry powder ready for treatment with water for dissolving the sulfates formed.

Instead of the second pan of the two-pan attack, the rotary kiln of Fig. 2, or the screw conveyor, we might use a ball mill in which the sulfation of the titanium ore can be effected, and the operations of this type are described in an application of Mr. F. H. McBerty, Ser. No. 51,247, filed on even date herewith.

We claim:
1. In a continuous process for rendering water soluble the titanium values of a titaniferous ore, the steps of mixing said ore in comminuted condition with sulfuric acid, feeding said ore and acid into a reaction zone in which the reaction between said ore and said acid is initiated, removing the initiated reaction mass from said zone before the reaction is completed, and feeding it into a second zone in which the mass is subjected to attrition and continuously moved forward toward the discharge end of said second zone and maintaining said mass in said second zone at elevated temperature, so that the mass is discharged therefrom in solid comminuted form.

2. The process of claim 1 in which said two zones are constituted by different apparatus.

3. The process of claim 1 in which said ore is ilmenite.

4. A continuous process for rendering water-soluble the titanium values of a titaniferous ore, comprising mixing said ore in finely-divided state with sulfuric acid, introducing the resultant mass into a primary reaction zone wherein the reaction between said ore and acid becomes incipient, passing the reacting mass into a soaking zone maintained under an elevated temperature wherein said mass is continuously kneaded, progressively advanced, and said reaction completed, and continuously discharging the reacted product in solid, comminuted state from said soaking zone.

5. The process of claim 4 wherein the ore employed is ilmenite.

6. A continuous process for the production of water-soluble sulfates from a titaniferous ore, comprising mixing said ore in a finely-divided state with sulfuric acid, introducing the resultant mixture into a primary reaction zone wherein the reaction between said ore and acid is initiated, passing the reacting semi-liquid mass into a secondary reaction zone maintained at an elevated temperature and wherein said initiated reaction becomes complete, subjecting the mass within said secondary zone to attrition and constant movement with respect to its confining walls, and continuously discharging the reacted product therefrom in solid, comminuted state.

JAMES E. BOOGE.
IGNACE J. KRCHMA.
ROBERT M. McKINNEY.